Sept. 17, 1940.                P. KOLLSMAN                2,215,447
                               TURN INDICATOR
                             Filed July 30, 1937          4 Sheets-Sheet 1

INVENTOR.
PAUL KOLLSMAN
BY
ATTORNEY.

Sept. 17, 1940.  P. KOLLSMAN  2,215,447
TURN INDICATOR
Filed July 30, 1937     4 Sheets-Sheet 2

INVENTOR.
PAUL KOLLSMAN
BY
ATTORNEY.

Sept. 17, 1940.  P. KOLLSMAN  2,215,447
TURN INDICATOR
Filed July 30, 1937  4 Sheets-Sheet 3
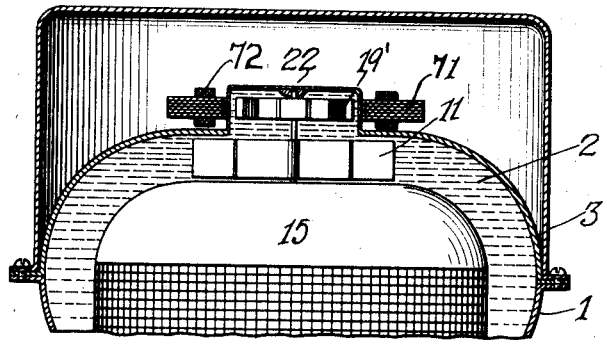
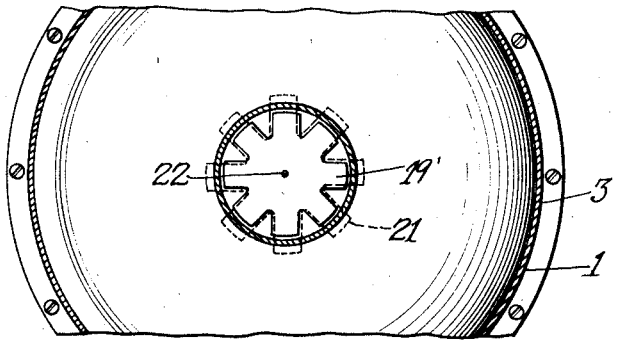
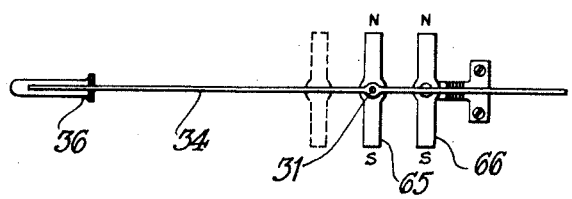
INVENTOR.
PAUL KOLLSMAN
BY
ATTORNEY.

Sept. 17, 1940.   P. KOLLSMAN   2,215,447
TURN INDICATOR
Filed July 30, 1937    4 Sheets-Sheet 4

INVENTOR.
PAUL KOLLSMAN
BY Leonard Key
ATTORNEY.

Patented Sept. 17, 1940

2,215,447

UNITED STATES PATENT OFFICE 2,215,447

TURN INDICATOR

Paul Kollsman, New York, N. Y.

Application July 30, 1937, Serial No. 156,550

24 Claims. (Cl. 33—204)

This invention relates to navigating instruments, and relates particularly to indicating instruments for showing the position and movements of vehicles. The invention relates more particularly to aircraft indicating instruments of the type of turn indicators which show the character and extent of rotational movements of an airplane.

In the navigation of airplanes, particularly navigation under difficult flying conditions such as at night or in fog or clouds, it is essential that instruments be provided to indicate to the pilot the character and extent of movements executed by his craft. Among the more important of these instruments is the turn indicator which shows the presence and amount of rotational movements of the craft about its various axes, particularly about a vertical axis.

Of the various instruments available for such purposes, particularly turn about a vertical axis, the compass, while it shows the direction of travel, does not readily indicate the presence and amount of turns, because of the tendency towards oscillation, and the necessity for a computation to ascertain the difference between the previous direction of travel and the instantaneous direction of travel. Furthermore, the compass is not an instrument showing rate, such as rate of turn, but merely a directional instrument. Other turn indicators have utilized various inertia devices and gyroscopes, but all of these devices have been found to be either inaccurate, unduly heavy, complicated, or unreliable, and to have various other faults and flaws.

The present invention provides a simple, inexpensive, rugged, light-weight instrument device which indicates the rate of turn of the craft upon which it is mounted.

A device according to this invention utilizes for its operation the inertia of a flowing stream of fluid, and combines in one instrument means for producing a flowing stream of fluid, means for removing turbulence from the flowing stream to produce a smooth even stream flow, and directing the flow in a suitable direction, means for accelerating the rate of flow of the smooth stream, means responsive to change in direction of flow of the smooth stream, and means for indicating the change in direction of flow to indicate the rate and direction of turn of the craft upon which the device of the invention is mounted.

The turn indicator is also useful for showing the attitude of the craft, especially when it is installed for indicating turns about the two respective horizontal axes. That is, when installed in such a way as to be responsive to rotation about a vertical axis it indicates primarily change in direction of travel; when installed in such a position as to be sensitive to movements about a transverse horizontal axis it indicates both angle of attack and climb; and when installed in such a way as to be responsive to rotation about a longitudinal horizontal axis it indicates the amount of roll or bank with relation to the horizon as distinguished from the ordinary bank indicator which merely indicates deviation of the vertical axis from the line representing the component of gravitation and centrifugal force caused by a turn.

The device of the invention further incorporates members for the correction of deviations in the amount of the readings resulting from temperature changes in the ambient atmosphere. Both the viscosity of the flowing stream and its density are influenced by temperature, and while the increase in density caused by lowered temperature of a liquid produces an error which is opposite in sign to the error produced by the increase in viscosity resulting from lowering of temperature, the two deviations do not necessarily neutralize each other. It is possible to find a suitable liquid in which the two deviations will neutralize each other over small temperature ranges. For this purpose the fluid hydrocarbon known as xylene is particularly suitable. Other similar substances such as toluene and benzol are also usable. Also minor changes in some of the physical characteristics of the device may occur which tend to alter the magnitude of the indication when the temperature changes, and while these deviations may be negligible for small temperature changes, they are not necessarily negligible for temperature extremes. The simplest way of compensating for these various temperature errors is by a change in speed of the flowing stream of fluid, and accordingly the device of the invention desirably includes, in addition to the elements above mentioned, a speed control mechanism for maintaining the rate of flow of the fluid stream constant at a regulated speed for a given temperature, and also temperature responsive means for varying the regulated speed of flow of the fluid stream as the temperature changes by an amount sufficient to compensate for the temperature deviations.

An object of the invention thus is to change the relative direction of flow of a stream of fluid by rotation of the container thereof, and to indicate the amount of the relative change of direction.

Another object of the invention is to produce a smoothly flowing accelerated stream of fluid, to indicate the direction of flow of the stream and to indicate the change in direction of flow produced by a change in angular position of the stream container.

Still another object of the invention is to generate a stream of flowing fluid, to sensitize the flowing stream to changes in position of the generating source, and to indicate thereby a change in position of the source.

A further object of the invention is to develop a stream of flowing fluid within a case attached to a navigable craft, and to utilize changes in the direction of flow of the stream of fluid to indicate the direction, and magnitude, of turns of the craft.

Another object of the invention is to accentuate and increase the response of a body of flowing fluid to a change in the direction of flow and to utilize the fluid response to obtain an increased response of an indicating or controlling member.

Still another object of the invention is to sensitize a flowing stream of fluid to changes in position, to utilize the flowing stream for producing an increased response in a mechanical member, and to utilize the response of the mechanical member for the operation of control functions for the maintenance or control of position and direction of movement of a vehicle.

Yet another object of the invention is to measure the rate of rotation of a movable craft, and to correct the indicated measurement by compensation for errors occurring with change in temperature.

Still a further object of the invention is to produce a flowing stream of fluid within a case attached to a navigable craft, by means of an air turbine magnetically coupled to a centrifugal pump, to remove turbulence from the flowing stream of fluid, to pass the flowing stream onto a vane system to rotate the vane system by changes in position of the craft and case, and to utilize movements of the vane by magnetic coupling to a member outside of the case for the actuation of a pointer or other operable mechanism.

Other objects and structural details of the invention will be apparent from the following description when read in connection with the accompanying drawings, wherein:

Fig. 3 is a top view partly in section showing the centrifugal pump and turbine;

Fig. 6 is a top view of an alternative form of the pointer control members;

Fig. 9 is a side view partly in section of an electric driving means for a device according to the invention.

Figure 2:
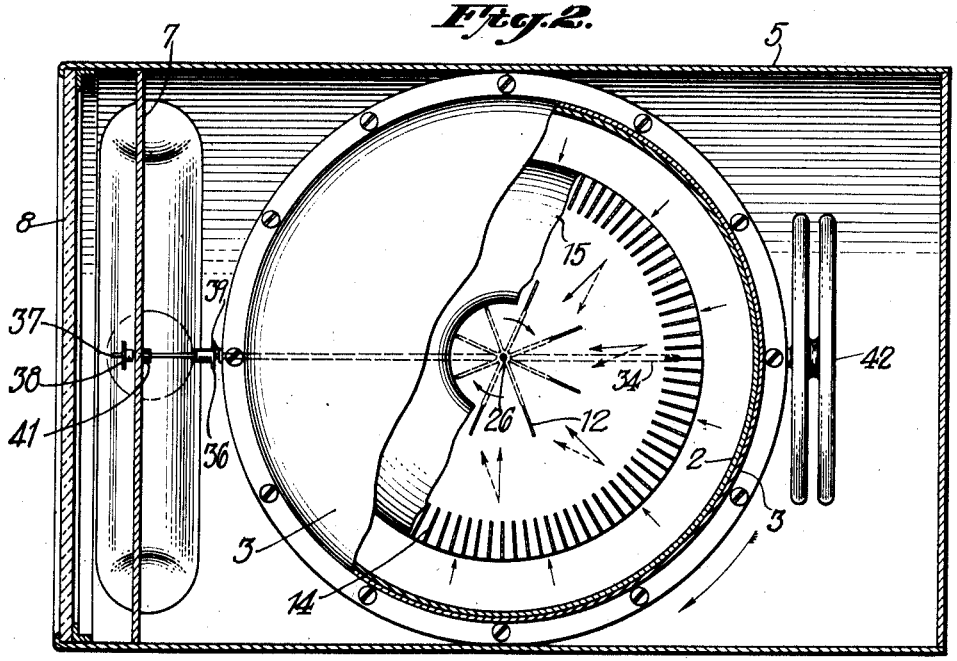
Fig. 2 is a top view partly in section of the device of the invention showing the vane and turbulence remover.

Referring to the figures, the mechanism of the invention incorporates a case member 1 providing a fluid chamber and a charge of fluid 2, preferably a liquid, such as the xylene previously mentioned. The liquid 2 is preferably a light hydrocarbon oil having a minimum of change of viscosity with change in temperature, or having an appropriate ratio of change of viscosity to change of density with change in temperature, in order to minimize temperature deviations in the various members of the device. Alternatively, a gaseous fluid may be used, or some of the very heavy fluids. (A powerful response is obtainable by using mercury for the fluid 2, but it is less suitable because of the structural difficulties encountered.)

Attached to the fluid case member 1 is a turbine case 3 housing a driving turbine wheel 4. A main casing member 5 is also provided for housing and protecting the entire structure. The casing portion 5 houses a dial portion 7, and there are also attached to the casing portion 5 a set of mounting lugs 6 and an inspection glass 8.

The heart of the instrument consists of the fluid circulating means, preferably a centrifugal pump member 11, which drives the fluid 2 within the case 1, an eddy eliminator in the form of fluid directing means or guiding surfaces 14, and a rotor 12, having surfaces or vanes exposed to the flowing fluid, thereby becoming responsive to the direction of flow of the fluid 2.

The cellular eddy eliminator and flow director 14 is positioned between the outlet of the pump 11 and the inlet to the rotor or vane system 12. The path of circulation of the fluid 2 is determined by the toroidal contours of the case 1 and the contours of a toroidal core 15 positioned therein. The pump member 11 is mounted upon a shaft 16 which is carried in a mid-bearing 17 and an upper bearing 18, attached to the case 3. There is also mounted upon the shaft 16 a driven magnet structure or armature 19. This desirably takes the form of a series of radial magnet poles, conveniently eight in number and having alternate north and south polarities.

As shown, the pump 11, the bearing 17, the shaft 16 and the magnet 19 are mounted within the case 1. The case 1 may be formed of such materials as aluminum, die-casting alloy, brass or molded composition, and it is desirably formed with a circular recess to receive the magnet structure 19, as is particularly well shown in Fig. 1. Outside of the case 1 there is positioned a second or driving magnet member 21, above the recess in the case 1, which houses magnet 19. The magnet 21 desirably is also formed with radial pole projections the same in number as the radial poles of the magnet 19 and also desirably having alternate north and south polarities. The ends of the poles of the magnet 21 are desirably turned over into a form similar to clasping fingers, as shown, in order partially to surround the magnet 19 which is positioned within the recessed portion of the case 1. This combination of magnets provides a highly efficient driving coupling to rotate the magnet 19 and the pump 11 without the use of a drive shaft and packing to make a fluid tight-joint, and efficient operation is obtained whether the case member 1 is made of metallic or non-metallic material. This efficiency is obtained by making the walls of the recess in the case 11 of the thinest possible material. Thin walls on the recess minimize the eddy currents generated in the metal of the wall, and with powerful magnets, particularly those composed of the higher grade magnetic materials such as the aluminum nickel cobalt steels, the loss of power from the eddy current is negligible. The driving magnet 21 is mounted upon a shaft 22 and the turbine wheel 4 is also mounted upon the shaft 22. A turbine nozzle 23 is provided in appropriate relationship to the turbine wheel 4 and an outlet 24 is provided from the case member 3. A jet of gas, such as air, through the nozzle 23 may be produced to drive the turbine wheel 4, by the application of suction from a "Pitot tube" or suction pump connected to the outlet 24, or by a source of gas, such as air, under pressure, connected to the inlet 25.

The vane structure or rotor 12 is also mounted upon a shaft member 26, the upper end of which is journaled in the bearing 17, the lower end of which is journaled in the bearing 27 carried upon the bottom of the case 1. The shaft 26 also carries a magnet 28 adjacent the recess shown in the bottom of the case 1. The magnet 28 is desirably made of high grade magnet steel such as the aluminum nickel cobalt magnet steel similar in character to that utilized for the magnets 19 and 21, and it may be a straight bar magnet having but two poles, or it may have several sets of poles in general similar to those of the magnets 19 and 21. Underneath the magnet 28, within the recess shown in the bottom of the case 1, there is provided a second magnet structure 29 similar to the magnet 28. The magnet 29 is carried upon a shaft 31, which is journaled in an upper bearing 32 and a lower bearing 33. Upon the shaft 31 there is also mounted a lever member 34 and a control spring member 35 biasing the lever towards a predetermined position. The lever 34 cooperates with a fork member 36 mounted upon a pointer shaft 37 which also carries the pointer 38 mounted in visible relationship with the dial plate 7 beneath the sight glass 8; the shaft 37 being mounted in convenient bearings 39 attached to the case 3, and 41 attached to the dial 7.

The case 1 is desirably entirely filled with fluid 2, to exclude air bubbles, and a difference in volume between the fluid and the volumetric capacity of the case 1 caused by changes in temperature and the difference in co-efficients in expansion between the case material and the fluid is allowed for by expansible silphon capsules 42 connected to the case 1.

As previously pointed out, the liquid 2 within the case is preferably a light oil of relatively low viscosity and of moderate density, and it is desirably chosen of such character that the change in density with change in temperature is neutralized by the change in viscosity with the same change in temperature in their respective effects upon the rotor 12. The primary requirement is, of course, that the fluid shall not congeal at the lowest temperature encountered in high altitude flying, and shall not boil at the highest temperature apt to be encountered in tropical flying. Alternatively, other liquids may be employed, or even gaseous fluids, although the rate of flow of the gaseous fluid necessary to obtain a sufficient torque effect upon the rotor 12 is considerably greater than the rate of flow for liquids.

In the operation of this device, a pressure differential is established at the nozzle 23 either by the connection of a suction means to the outlet 24, or the connection of a source of air pressure to the inlet 25.

The jet from the nozzle 23 impinges upon the turbine wheel 4 and brings it up to a speed which may conveniently be in the neighborhood of about 900 revolutions per minute. The rotation of the turbine wheel 4 rotates the magnet 21, which draws with it the armature 19, which in turn rotates the pump impeller or rotor 11. The pump rotor causes the fluid 2 to circulate, the fluid leaving the impeller 11 in the form of an annular sheet of radially moving liquid. The direction of travel of the fluid is controlled and modified by the contours of the case or chamber 1 and the fluid is delivered to guiding surfaces, the annular eddy eliminator 14, to produce a smoothly flowing stream of fluid which travels centrally inwardly towards the center of the fluid chamber to act upon the vanes of the rotor 12 in a direction parallel to the vanes and thence flows centrally along the axis of the chamber along the shaft 26. As long as the case member 1 and with it the guiding surfaces 14 are stationary, the direction of flow of the fluid 2 remains constant, and parallel to the plane of the radial vanes 12.

The effect of the guiding surfaces or eddy eliminator 14 is to produce a steady uniform flow of fluid through the cellular passages in the eliminator, and accordingly the fluid flow is directed in a truly radial path centrally towards the center of the fluid chamber. Since the cross-sectional area of the stream decreases rapidly as the center is approached, the speed of flow of the fluid necessarily increases greatly during the travel of fluid from the eliminator to the central passage. Thus, each particle of liquid is given a strong impulse and an acceleration in a direction which is determined by the directive effect of the passages in the eliminator, as is well shown by the solid arrows in Fig. 2. When, however, the case and with it the eliminator 14 are rotated, each particle of flowing fluid is given an impulse in a sidewise direction in addition to the impulse and acceleration in the radial direction, and accordingly the path of the fluid flow is changed to that indicated by the dotted arrows. The resultant path may be a straight line with a tangential component with respect to the blades of the rotor 12. The modified path of flow may be a straight line as indicated by the dotted arrows, or may be curved in one direction or the other according to the upper and lower contours of the path through which the stream of fluid flows. In any event, the tangential component of the direction of flow exerts a strong pressure upon the vanes 12 and rotates them with considerable force in a direction which is the same as the direction of rotation of the instrument. That is, considering Fig. 2, if the plane turns towards the right, the guiding surfaces of the eddy eliminator 14 are turned in a clockwise direction, and the vanes 12 are also turned in a clockwise direction at a greater rate than the turn of the instrument and eddy eliminator, and this turn is accomplished with a relatively large amount of applied power upon the vanes 12. Thus the movement of the vanes 12 occurs as a relative change in position between the vanes 12 and the case member, in the same direction as the movement of rotation of the instrument in space. This rotation of the vanes 12 causes the magnet 28 to rotate which in turn draws with it the magnet 29 and the lever 34 to swing the fork 36 and pointer 38, thereby indicating the presence and extent of a turn of the craft to which the indicator is attached.

The device of the invention thus is entirely different from the gyroscopic or other types of inertia devices which depend upon the inertia characteristics of heavy or gyroscopically rotating devices. Such inertia devices depend upon the tendency of the sensitive members to retain their previous position, and lag behind the movement of the instrument, whereas an instrument according to the present invention operates on a dynamic principle causing the sensitive movable member to move a relatively greater amount in space than the instrument body proper.

Thus in the embodiment shown the various moving bodies of the instrument, aside from the moving fluid, are made with a minimum of inertia, and the accelerating effect of the flowing stream is utilized to produce a substantial torque which is available for the operation of the indicating or control members.

The viscosity and density of the fluid 2 within the device are subject to change in response to changes in temperature of the surroundings and ambient atmosphere. The change in viscosity may result in a change in the speed of flow of the fluid for a given speed of rotation of the impeller 11, and such change in speed may cause a reduction in impact pressure on the vanes, in pointer indication, and a reduction in instrument reading when, for example, the temperature is reduced. Simultaneously, however, the density of the fluid 2 increases, and the increase in density results in an increased pressure upon the vanes 12 at a given speed of stream flow. Thus, these two errors tend to neutralize each other and by proper choice of circulating fluid, such as xylene, neutralization of the aforementioned errors may be obtained over substantial ranges of temperature. It is, however, difficult to secure a fluid in which these two phenomena provide complete compensation over extreme changes in temperature.

Figure 8:
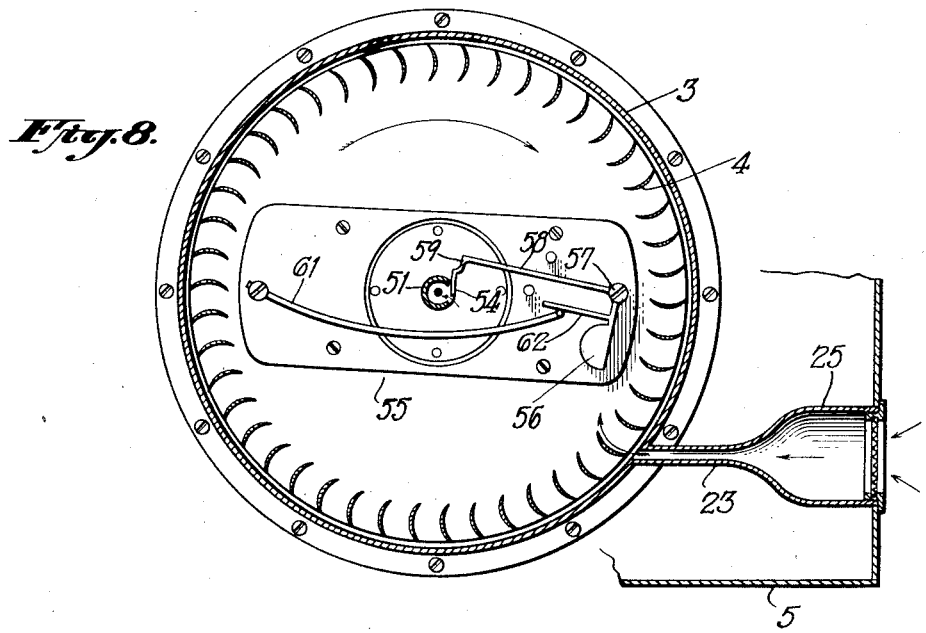
Fig. 8 is a top view of the embodiment of Fig. 7.

Also, other parts of the instrument may change their characteristics with changes in temperature. Thus, the spring 35 may change its modulus of elasticity with change in temperature, and the physical dimensions of the device change with change in temperature. All of these changes may result in alterations of the extent of movement of the pointer 38 for the same amount of rotation of the instrument when the temperature of the instrument is changed. In order to compensate for these temperature deviations, the speed of the impeller wheel 11 and the speed of the flowing fluid may be changed by an appropriate amount. For this purpose, the speed of the turbine wheel 4 may be changed in any appropriate way. A temperature control may be applied to the nozzle 23 to adjust its size, and thereby the strength of the jet of air impinging on the turbine wheel 4. Alternatively, a combined speed control and temperature compensation may be obtained by the mechanism shown in Fig. 8. This device consists of a tubular extension 51 mounted upon the turbine motor 4. This tubular extension is concentric with the axis of the rotor 4 and extends upward into a pocket 52 in the upper portion of the case member 3. The tubular extension 51 has openings, as shown, which discharge into the cavity 52 at the top of the member 3. The journal portion 53 may be utilized as a steady bearing if desired. The discharge tube 24 is then connected to the pocket 52 for discharge of the driving air. Near the bottom of the tubular extension 51 there is cut an inlet port 54, which permits the passage of the driving air from the interior of the turbine 4 to the outlet duct 24. A frame plate member 55 is attached to the top of the turbine rotor 4 surrounding the extension 51, as shown in Fig. 8. Upon this plate there is mounted a centrifugal governor weight 56 carried upon a supporting bearing 57, and an arm 58 with a valve plate 59 is attached to the weight 56. Thus when the turbine rotor is spinning, the centrifugal force tends to throw the weight 56 outward, and swing the valve plate 59 over the port 54 to throttle the air flow, thereby reducing the pressure differential at the nozzle 23. This tendency towards movement is opposed by a spring member 61 bearing against an arm 62 which is also attached to the weight 56. The spring 61 may, if desired, be merely spring steel, in which case it serves to maintain a constant speed of rotation of the turbine wheel 4. Preferably, however, the spring 61 is made of "bimetal," that is, welded sheets of brass and invarsteel. This construction utilizing the bi-metal spring provides a temperature compensation which varies the speed of the turbine with a change in temperature, and thereby provides a highly desirable compensation for the above described errors such as changes in viscosity, or in density of the fluid, and other changes in the mechanical members.

It is, of course, obvious that still other types of speed governors and of temperature compensated governors may be utilized for control of the speed of the rotor 4.

In the embodiment shown, a control spring 35 is provided for biasing or returning the pointer 38 to mid-position or zero-turn position, and a part of the temperature compensation above mentioned is required because of the change in the modulus of elasticity of the material from which this spring is formed. This compensation may be avoided and many other advantages obtained by the utilization, in place of the spring 35, of the magnetic control means shown in Fig. 6.

In this embodiment, a bar magnet 65, having north and south poles, is attached to the shaft 31 in place of the spring 35, and at one side, parallel to the magnet 65 when in zero position, there is mounted another magnet 66 which is desirably closely similar in size and contours to the magnet 65. The magnet 66 is mounted with its north pole adjacent to the north pole of the magnet 65, as shown in Fig. 6, and consequently with the south poles of the two magnets adjacent. Both of these poles tend to repel the adjacent poles of like polarity, and accordingly the magnet 65, and with it the whole vane and pointer system, is controlled or biased to mid-position to be displaced therefrom by a torque applied to the vanes 12. The magnitude of this torque is, as is well known in the art, proportional to the rate of rotary movement of the rotor 12. Accordingly the form of instrument shown in this figure will indicate rate of turn.

By this construction there is thus provided a very simple, efficient, light-weight turn indicator particularly suitable for airplane service, but adapted to use in connection with any moving vehicle to indicate the existence and extent of rotational movements about any desired axis.

The device as above described is particularly adapted to utilization as a turn indicator to show the presence, and extent, of rotation about a vertical axis. It is, however, equally well adapted to show the existence of and amount of rotation around other axes. Thus, if the axes of the shafts 22 and 26 are positioned transversely of the vehicle, the device indicates rotation about the horizontal transverse axis and is particularly well adapted to indicate the angle of climb (or descent) of the aircraft. Similarly, if the axes of the shafts 22 and 26 are positioned parallel to the longitudinal axis of the plane, the position or posture of the plane in flight is indicated, and the pilot is informed whether his plane is level, and in straight ahead flight, or whether either wing is low, and he is likewise informed as to the actual amount of bank utilized in making turns.

Thus the instrument is sensitive, and responsive, to change of position in any respect, and can be utilized to indicate both change in position, rate of change in position, and absolute position.

The device may further be utilized for controlling means. It is particularly adapted to inclusion in any of various forms of "automatic pilot" by which desired character of flight is obtained without manual intervention. That is, there is ample power developed by the vanes 12 to operate the various types of relay mechanisms, such as electric relays or air power relays, and the greater power of the relay output may be utilized for any desired control actuation, such as for steering in a straight line, or for maintaining level flight, or for maintaining balance of the plane without actuation by the pilot.

Figure 1:
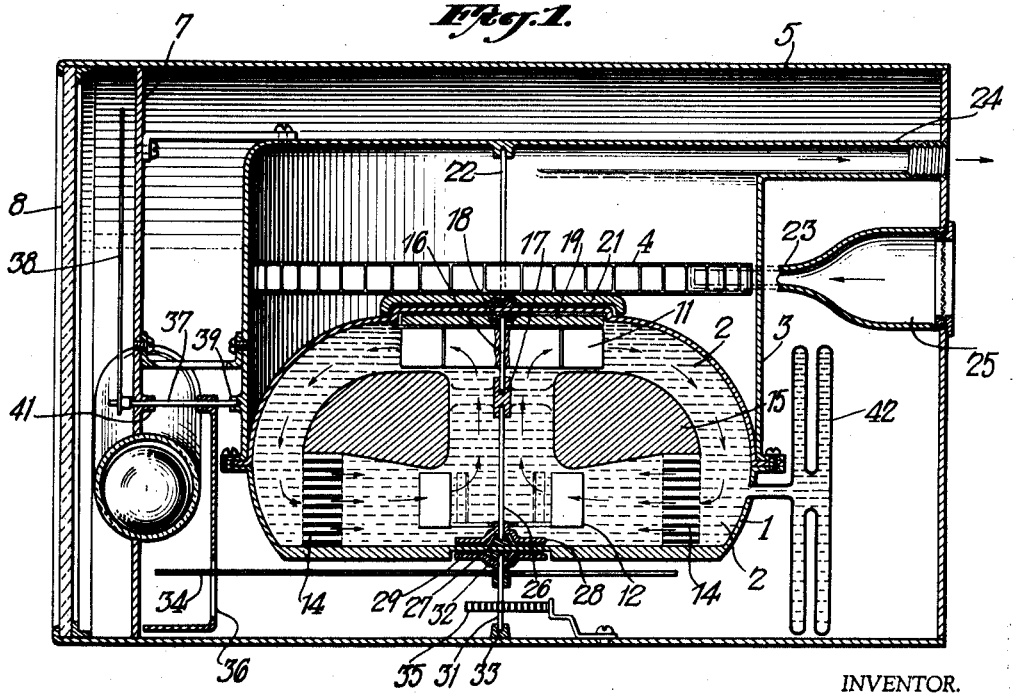
Fig. 1 is a view in vertical section of a device according to the invention.
Figure 4:
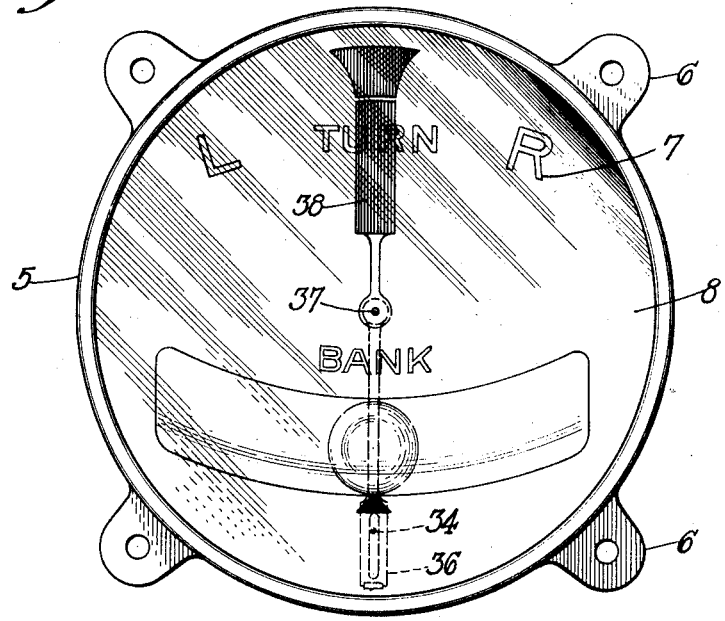
Fig. 4 is a front view of the device showing the turn pointer and bank indicator.
Figure 5:
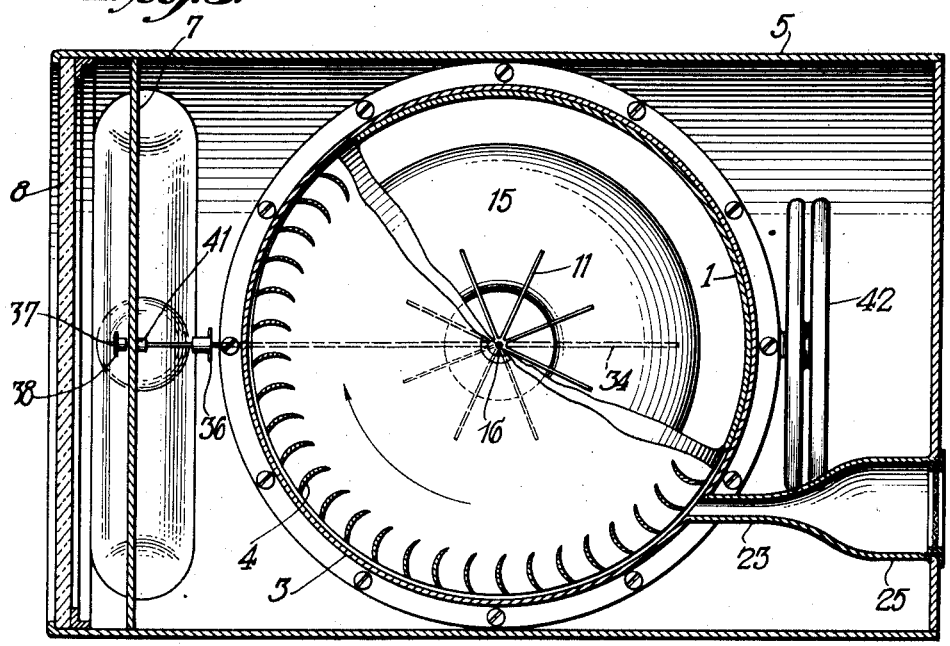
Fig. 5 is a top view of the magnetic coupling system.
Figure 7:
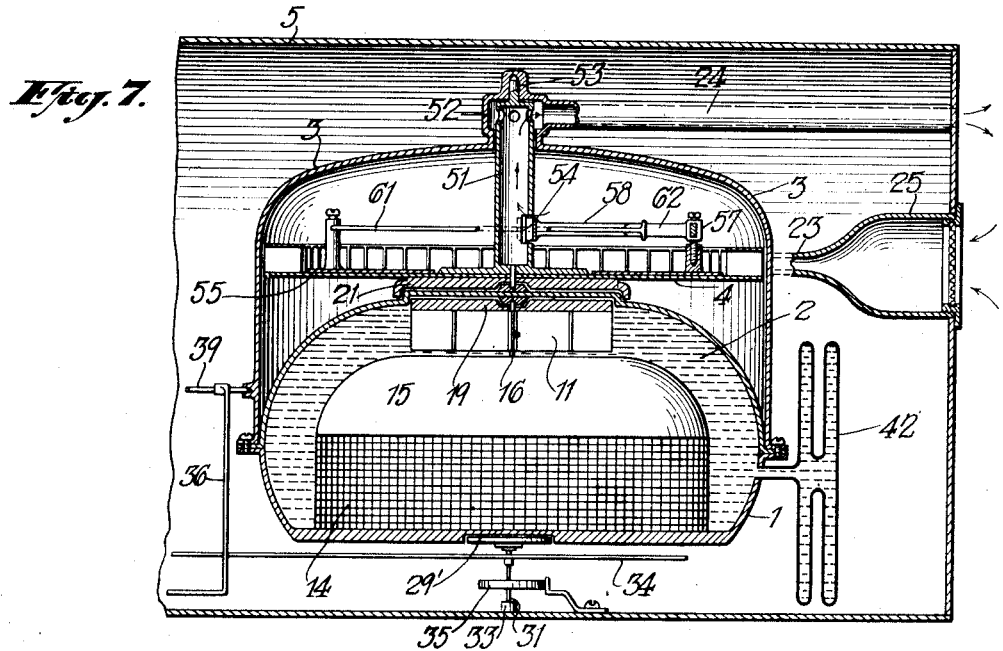
Fig. 7 is a side view partly in section of a form of speed control mechanism.

The embodiment as above described is shown as adapted to the actuation of the device by an air driven turbine wheel. Equally satisfactory and efficient results are obtainable by the application of an electric drive in place of the turbine drive and magnetic coupling as shown in Fig. 1. Thus the top of the case member 1 may be made with a recess, as before described, to contain the magnet 21 which is attached to the impeller wheel 11. The top recess, as before, is made with as thin walls as possible and is surrounded by a laminated field structure 71, as shown. This field structure contains a power winding 72 which may conveniently be a poly-phase motor winding of the usual type. This type of driving mechanism occupies somewhat less space than the air turbine drive and develops somewhat greater power. It is particularly convenient for use on the larger transport planes which are equipped with independent electric generators driven by separate motors to supply current to the various light and power needs of the plane. The frequency obtainable from these generators is usually relatively high, thereby making it possible to use an armature 21 and winding 72 having a considerable number of poles. Thus, when the frequency generated by the plane lighting generator is as high as 120 cycles per second, and the speed of the impeller 11 is to be 900 R. P. M., the number of poles in the winding 72 and the armature 19' may be as high as 16, thereby obtaining a particularly rugged and powerful drive.

The case pocket housing the armature 19' may be formed of the same material as the case 1; that is, aluminum or an aluminum base die-casting alloy, as desired, and under such conditions, the eddy currents developed in the case member are sufficiently small to be negligible. The eddy current losses can, however, be still further reduced by the use of a high resistance alloy material such as manganin, or other of the relatively strong high resistance alloy materials, which may be formed into a cap or recess and attached to the case 1, over the armature 19', to close the case and prevent loss of liquid, while permitting the driving forces to actuate the magnet coupling members.

While there are above disclosed but a limited number of embodiments of the device of the invention, it is possible to produce still other embodiments without departing from the inventive concept herein disclosed, and it is therefore desired that only such limitations be imposed upon the appended claims as are stated therein or required by the prior art.

In the claims the term "central with respect to an axis" as defining the direction of a flow of fluid is used as a generic term. This term is to include the definition of a flow directed radially towards or away from an axis such as the converging flow between the guiding surfaces 14 and the vanes of the rotor 12, as well as the definition of a flow flowing in substantially axial direction and surrounding the axis as, for example, the part of the flow between the rotor 10 12 and the centrifugal pump 11. Generally, accordingly, a flow of fluid directed in a predetermined direction, central with respect to an axis, is affected by a rotation of the flow directing means causing a twist or whirl of the flow and the term "central with respect to an axis" is used to define such flow.

What is claimed is:

1. An indicator comprising a source of power, a fluid impeller driven thereby, a fluid driven thereby, an annular conduit adapted to the carrying of fluid radially discharged from said impeller, and to translate the direction of flow of said fluid into a radially inward direction, a vane system mounted in said radially inward flow to be responsive to changes in the direction of flow of said fluid, means for indicating changes in direction of flow comprising a pointer mechanism coupled to said vane member, and a control spring for biasing said pointer mechanism to a no turn position.

2. A turn measuring instrument comprising a turbine wheel, means directing a vapor jet for the actuation thereof, a fluid impeller, means for coupling said impeller to said turbine, a closed casing enclosing and cooperating with said impeller, a fluid within said closed casing, members within said container forming a radial annular path for fluid flow, means for eliminating eddies in said fluid and for directing said fluid into a radially inward flow path, a vane member mounted in the path of said flowing fluid cooperating with said flowing fluid and influenced by the direction of flow, an indicating mechanism, and members coupling said indicating mechanism to said vane member.

3. A turn measuring instrument comprising a turbine wheel, means directing a vapor jet for the actuation thereof, a fluid impeller, means for coupling said impeller to said turbine, a closed casing enclosing said impeller, a fluid within said closed casing, members within said container forming a radial annular path for fluid flow, means for eliminating eddies in said fluid and for directing said fluid into a radially inward flow path, a vane member in said inward flow path, an indicating mechanism, members coupling said indicating mechanism to said vane member, and temperature responsive members cooperating with said turbine wheel to control the speed thereof for producing a temperature compensation to cause the said pointer to indicate correct amount of rotation, over a range of temperature.

4. In an indicating instrument, a movable member, a first magnet attached thereto and movable therewith, and a second magnet mounted adjacent thereto and parallel therewith, the north poles of the respective magnets being adjacent, and the respective south poles being adjacent.

5. In an indicating instrument the combination with an indication producing mechanism, of a pair of magnets, one attached to said mechanism, and the other fixedly positioned adjacent thereto, with like poles of said respective magnets adjacent.

6. In combination, a stream of fluid, means for driving said stream of fluid, means for directing said fluid in a pre-determined direction, means responsive to a change in direction of said stream, and temperature responsive means for varying the speed of said driving means in response to temperature change by an appropriate amount to compensate for changes in density and viscosity of said fluid with change in temperature.

7. In an airplane instrument, a case member, a fluid within said case, contours and directive members in said case adapted to direct said fluid in a smoothly flowing radially directed stream, a vane member having vane portions parallel to the normal direction of flow of said fluid stream, a pointer mechanism connected with said vane member to indicate change in position of said vane, means for driving said fluid circulating means comprising a magnetic coupling having a portion within said case, and a portion outside of said case, a turbine member connected to said exterior coupling member, and a temperature responsive means for controlling the speed of said turbine member.

8. A turn responsive instrument comprising, in combination, means for directing a flow of fluid radially towards, and converging from all sides at, an axis about which turning movements are to be ascertained; and a rotor mounted for rotation about said axis relatively to said flow directing means, said rotor having surfaces exposed to said flow thereby becoming responsive to deviations of said flow from said predetermined direction, whereby upon a rotation imparted to said directing means said rotor will be rotated relatively to said directing means.

9. A turn responsive instrument comprising, in combination, means for directing a flow of fluid in a straight path parallel with and surrounding an axis about which turning movements are to be ascertained; and a rotor mounted for rotation about said axis relatively to said flow directing means, said rotor having surfaces exposed to said flow thereby becoming responsive to deviations of said flow from said predetermined direction, whereby upon a rotation imparted to said directing means said rotor will be rotated relatively to said directing means.

10. A turn responsive instrument comprising, in combination, means for directing a converging flow of fluid in a predetermined direction symmetrically radially towards an axis, including means providing a path for said fluid of decreasing cross-sectional area towards said axis about which turning movements are to be ascertained; and a rotor mounted for rotation about said axis relatively to said flow directing means, said rotor having surfaces exposed to said converging flow, thereby becoming responsive to deviations of said flow from said predetermined direction, whereby upon a rotation imparted to said directing means said rotor will be rotated relatively to said directing means.

11. A turn responsive instrument comprising, in combination, a casing of annular cross-section including guiding surfaces therein for directing a flow of fluid radially towards, and converging from all sides at, the central axis of said casing; a rotor mounted for rotation about said axis relatively to said casing, said rotor having radial vanes exposed to said flow of fluid, thereby becoming responsive to deviations of said flow from said radial direction, whereby, upon a rotation imparted to said casing about said central axis, said rotor will be rotated relatively to said casing.

12. A turn responsive instrument comprising, in combination, a casing providing a hollow chamber and having a core therein of substantially toroidal form having a central axis; a charge of fluid in said casing; means for circulating said fluid within said chamber about said core in a path substantially radially towards said central axis to converge at said axis, flow along said axis and then away from said axis to repeat the same circuit; a rotor mounted for rotation about said axis relatively to said casing, said rotor having radial vanes exposed to said radially inward flow of fluid, thereby becoming responsive to changes in the direction of the flow of said fluid, incidental to a rotation imparted to said casing about said axis.

13. A turn responsive instrument comprising, in combination, a casing providing a hollow chamber and having a core therein of substantially toroidal form having a central axis; a charge of fluid in said casing; a centrifugal pump rotor circulating said fluid within said chamber about said core in a path radially towards said central axis to converge at said axis, flow along said axis and then away from said axis to repeat the same circuit; fixed guiding surfaces in said chamber for removing turbulence of said fluid and directing said fluid radially towards said axis; a rotor mounted for rotation about said axis relatively to said casing, said rotor having radial vanes exposed to fluid directed radially inward towards said axis by said guiding surfaces, thereby becoming responsive to deviations of the directed flow from said radial direction incidental to a rotation impartetd to said instrument casing about said axis.

14. A turn responsive instrument comprising, in combination, a casing including means for directing a flow of fluid in a predetermined direction symmetrically central with respect to an axis about which turning movements are to be ascertained; a rotor mounted for rotation about said axis relatively to said casing, said rotor having surfaces exposed to said central flow, thereby becoming responsive to deviations of said flow from said predetermined direction; and indicating means connected to be actuated by said rotor in response to rotary movements of said rotor relatively to said casing.

15. A turn responsive instrument comprising, in combination, a casing including means for directing a flow of fluid in a predetermined direction symmetrically central with respect to an axis about which turning movements are to be ascertained; a rotor mounted for rotation about said axis relatively to said casing, said rotor having surfaces exposed to said central flow, thereby becoming responsive to deviations of said flow from said predetermined direction; a movable pointer connected to be actuated by said rotor in response to rotary movements of said rotor relatively to said casing; and means for biasing said pointer towards a predetermined position.

16. A turn responsive instrument comprising, in combination, a casing including means for directing a converging flow of fluid radially towards, and converging from all sides at, a central axis about which turning movements are to be ascertained, the path of said fluid being of decreasing cross-sectional area towards said axis; a rotor mounted in said casing for rotation about said axis relatively to said casing, said rotor having radial surfaces exposed to said converging flow of fluid, thereby becoming responsive to deviations of said flow from said predetermined direction; and indicating means connected to be actuated by said rotor in response to rotary movements of said rotor relatively to said casing.

17. A turn responsive instrument comprising, in combination, a casing including means for directing a converging flow of fluid radially towards, and converging from all sides at, a central axis about which turning movements are to be ascertained, the path of said fluid being of decreasing cross-sectional area towards said axis; a rotor mounted in said casing for rotation about said axis relatively to said casing, said rotor having radial surfaces exposed to said converging flow of fluid, thereby becoming responsive to deviations of said flow from said predetermined direction; indicating means; and means responsive to the rate of rotary movement of said rotor connected to said indicating means.

18. A turn responsive instrument comprising, in combination, a casing providing a hollow chamber and having a core therein of substantially toroidal form having a central axis to be aligned with an axis about which turning movements are to be ascertained; a charge of fluid in said casing, means for circulating said fluid within said chamber about said core in a path substantially radially towards said central axis to converge at said axis, flow along said axis and then away from said axis to repeat the same circuit; a rotor mounted for rotation about said axis relatively to said casing, said rotor having radial vanes exposed to said flow of fluid, thereby becoming responsive to changes in the direction of said fluid incidental to a rotation imparted to said casing; indicating means; and means responsive to the rate of rotary movement of said rotor connected to actuate said indicating means.

19. In a turn responsive instrument a closed toroidal fluid chamber having a central axis; a toroidal core mounted co-axially therein; a charge of liquid filling the space between said core and chamber; a first rotor within said chamber for circulating said charge of liquid about said core in a path substantially radially towards said central axis to converge at said axis, flow along said axis, and then away from said axis to repeat the same circuit; an armature carried by said first rotor; a driving magnetic element mounted outside said chamber and co-axial with said first rotor acting on said armature; a second rotor having radial vanes mounted within said chamber for rotation about said axis; guiding surfaces fixedly mounted within said chamber directing the converging liquid onto the vanes of said second rotor; a movable member outside said chamber; and a magnetic coupling including a first and a second coupling member connected to said second rotor and said movable member, respectively, for actuating said movable member through the wall of said chamber in response to rotary movements of said second rotor caused by a rotation imparted to said chamber.

20. In a turn responsive instrument a closed toroidal fluid chamber having a central axis; a toroidal core mounted co-axially therein; a charge of liquid filling the space between said core and chamber; a first rotor within said chamber for circulating said charge of liquid about said core in a path substantially radially towards said central axis to converge at said axis, flow along said axis, and then away from said axis to repeat the same circuit; an armature carried by said first rotor; a driving magnetic element mounted outside said chamber and co-axial with said first rotor acting on said armature; a second rotor having radial vanes mounted within said chamber for rotation about said axis; guiding surfaces fixedly mounted within said chamber directing the converging liquid onto the vanes of said second rotor; a movable member outside said chamber; a magnetic coupling including a first and a second coupling member connected to said second rotor and said movable member, respectively, for actuating said movable member through the wall of said chamber in response to rotary movements of said second rotor caused by a rotation imparted to said chamber; and means for biasing said movable member towards a predetermined position.

21. In a turn responsive instrument the combination with means for directing a flow of fluid in a predetermined direction, a rotor having surfaces aligned with said direction, said rotor being acted upon by said flow, and means for mounting said rotor in said flow for turning in response to changes in direction of said flow; of means responsive to changes in temperature of said fluid for controlling the rate of flow of said fluid in response to such changes in temperature.

22. In a turn responsive instrument the combination with means for circulating a fluid, means for directing said fluid in a predetermined direction, a rotor having surfaces aligned with said direction, said rotor being acted upon by said flow, and means for mounting said rotor in said flow for turning in response to changes in direction of said flow; of means responsive to changes in temperature of said fluid for controlling said means for circulating said fluid in response to such changes in temperature.

23. A turn responsive instrument comprising, in combination, a closed toroidal fluid chamber having a central axis; a toroidal core mounted co-axially therein; a charge of liquid filling the space between said core and chamber; a first rotor within said chamber for circulating said charge of liquid about said core in a path substantially radially towards said central axis to converge at said axis, flow along said axis, and then away from said axis to repeat the same circuit; an armature carried by said first rotor; a driving permanent magnet mounted outside said chamber and co-axial with said first rotor acting on said armature; a turbine wheel connected to said permanent magnet; means including a nozzle directing a jet of air against said wheel for driving the same; means responsive to the speed of said wheel connected to control the flow of said driving air in response to the speed of said wheel; a second rotor having radial vanes mounted within said chamber for rotation about said axis; guiding surfaces fixedly mounted within said chamber directing the converging liquid onto the vanes of said second rotor; a movable member outside said chamber; and a magnetic coupling including a first and a second coupling member connected to said second rotor and said movable member, respectively, for actuating said movable member through the wall of said chamber in response to rotary movements of said second rotor caused by a rotation imparted to said chamber.

24. A turn responsive instrument comprising, in combination; a closed toroidal fluid chamber having a central axis; a toroidal core mounted co-axially therein; a charge of liquid filling the space between said core and chamber; a first rotor within said chamber for circulating said charge of liquid about said core in a path substantially radially towards said central axis to converge at said axis, flow along said axis, and then away from said axis to repeat the same circuit; an armature carried by said first rotor; a driving permanent magnet mounted outside said chamber and co-axial with said first rotor acting on said armature; a turbine wheel connected to said permanent magnet; means including a nozzle directing a jet of air against said wheel for driving the same; a centrifugal force actuated governor responsive to the speed of said wheel; a bimetallic spring connected to said governor to counteract said governor; means connected to be operated by said governor for controlling the flow of said driving air; a second rotor having radial vanes mounted within said chamber for rotation about said axis; guiding surfaces fixedly mounted within said chamber directing the converging liquid onto the vanes of said second rotor; a movable member outside said chamber; and a magnetic coupling including a first and a second coupling member connected to said second rotor and said movable member, respectively, for actuating said movable member through the wall of said chamber in response to rotary movements of said second rotor caused by a rotation imparted to said chamber.

PAUL KOLLSMAN.